March 2, 1943. C. G. STRANDLUND 2,312,371
PLOW BOTTOM
Filed Sept. 5, 1939 2 Sheets-Sheet 2
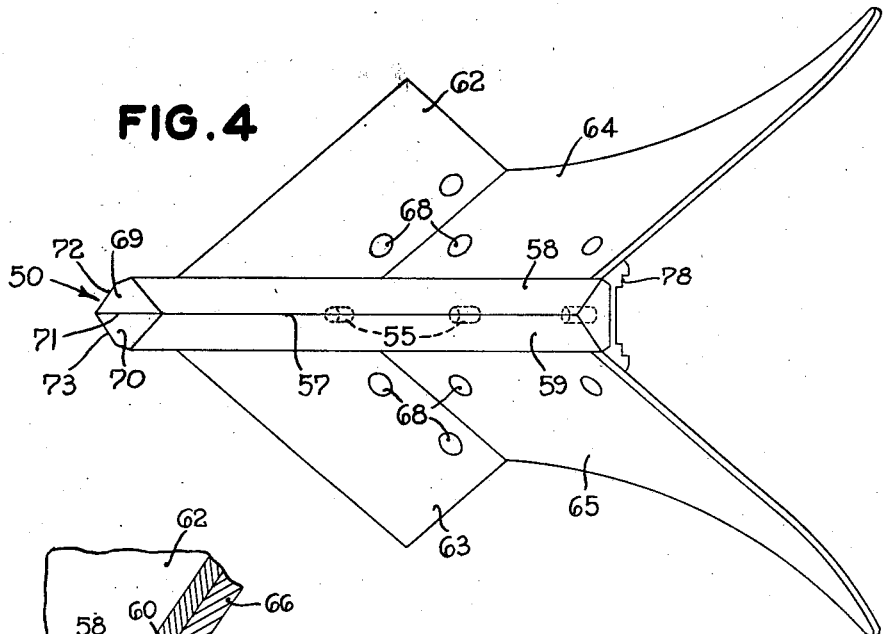
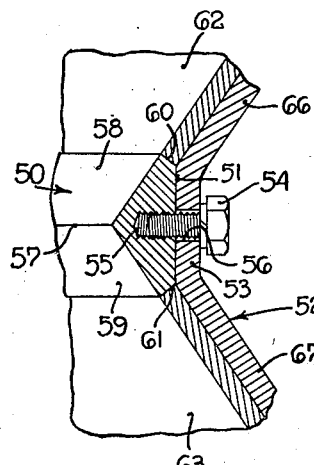
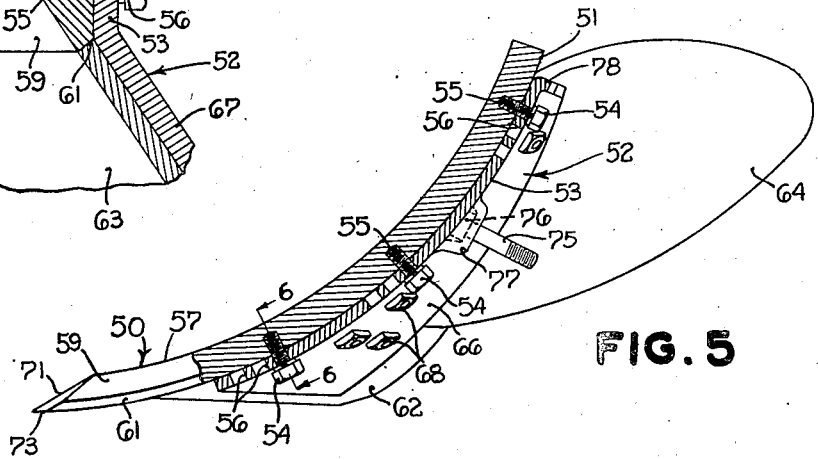
INVENTOR:
CARL G STRANDLUND
BY
ATTORNEYS.

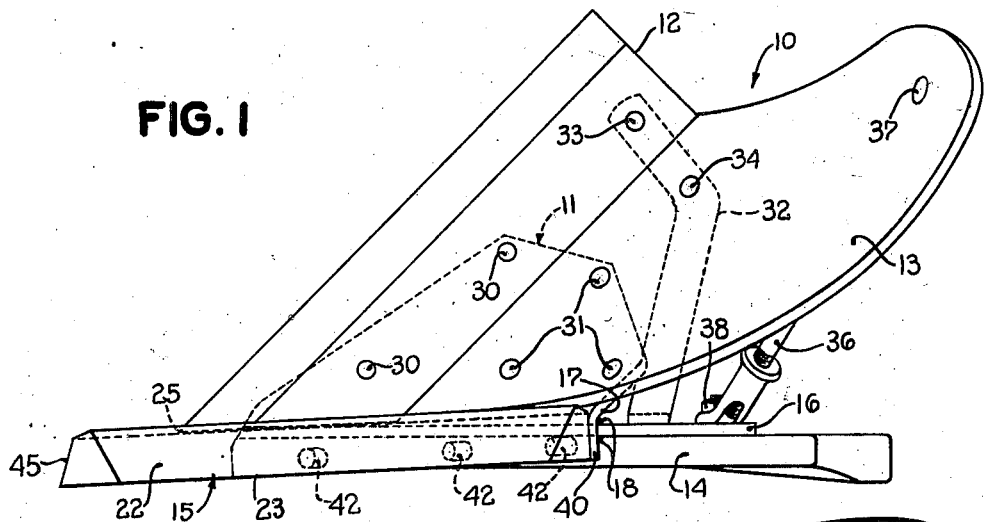
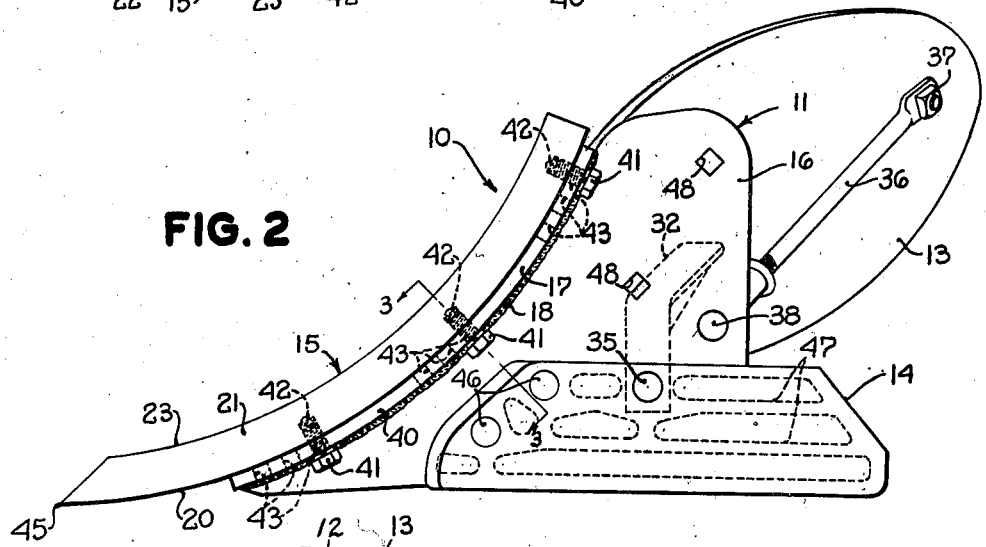
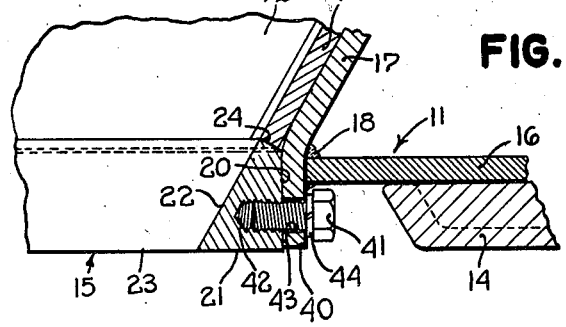

Patented Mar. 2, 1943

2,312,371

UNITED STATES PATENT OFFICE 2,312,371

PLOW BOTTOM

Carl G. Strandlund, Moline, Ill., assignor to Deere & Company, Moline, Ill., a corporation of Illinois Application September 5, 1939, Serial No. 293,437

8 Claims. (Cl. 97—113)

The present invention relates to plow bottoms and has for its principal object the provision of a novel and improved plow bottom fabricated of structural metal parts without the necessity for the intricate welding operation now required to produce the parts of a plow bottom of conventional wear resisting construction.

A further object of my invention relates to the provision of a plow bottom in which the part which receives the greatest wear is detachable and adjustable, and can be easily removed and sharpened by grinding or other suitable method and then replaced and adjusted to the proper position to compensate for the metal lost by wear and in sharpening. More specifically, it is the object of my invention to provide a plow bottom having a combined point and shin member which can be securely fixed along the front edge of the plow bottom but is adjustable to permit the member to be shifted downwardly as the point wears off during operation.

Another object of my invention concerns the provision of a heavy detachable shin member which resists both wear and bending but which can be repeatedly sharpened to maintain a proper ground cutting edge. A related object of my invention has to do with the provision of a detachable shin member which is of sufficient thickness that it can be secured to the frog by studs which can be inserted through the frog from beneath and engaged in threaded sockets in the lower side of the shin member. This feature eliminates the necessity for bolt heads in the upper or ground working surface of the shin member and thereby providing for free and unobstructed passage of soil across the working face of the member.

Still another object relates to the provision of a unitary detachable member serving both as the ground breaking point and the wearing shin of the plow in which the lower end of the member extends forwardly from the frog substantially tangent with the surface upon which the plow bottom rests in order to distribute the pressure against the ground and thus better resist the strains imposed thereupon during normal operation.

A further object of my invention is to provide a plow bottom which can be produced at relatively low cost without sacrificing strength or length of life. This is realized by virtue of the fact that the greatest wear and abrasion on a plow takes place at the point and along the shin, while the remainder of the share, moldboard and landside are subjected to considerably less wear. By making the combined point and shin member of extremely hard steel and providing a generous amount of adjustment for wear, it is possible to make the rest of the plow bottom of considerably lighter and cheaper material, thereby effecting considerable saving without sacrificing strength and durability.

These and other objects and advantages of my invention will be made apparent by a consideration of the following description and explanation, reference being had to the drawings appended hereto, in which Figure 1 is a plan view of a plow bottom of the single moldboard type embodying the principles of my invention;

Figure 2 is an elevational landside view of the plow bottom;

Figure 3 is a sectional view drawn to a larger scale taken along the line 3—3 in Figure 2 and showing the method of securing the shin member to the frog of the plow bottom;

Figure 4 is a modification showing a middlebreaker or double moldboard plow bottom in plan view;

Figure 5 is a sectional elevation taken along the center line of the plow bottom shown in Figure 4; and Figure 6 is a sectional detail drawn to a larger scale, taken along the line 6—6 in Figure 5.

Referring now to the drawings, more particularly to Figures 1, 2 and 3, the plow bottom indicated in its entirety by reference numeral 10 comprises a frog 11 on which is supported a share 12, a moldboard 13, a landside 14 and a combined shin and ground breaking point 15. The frog 11 is fabricated from steel plates and comprises one plate 16 lying in a fore and aft extending vertical plane, and a curved plate 17 disposed transversely of the vertical plate 16 and welded at 18 thereto along the forward edge thereof. The combined shin and point member 15 consists of a bar curved in a circular arc and disposed with its concave side facing upwardly. The bar is supported on the frog with the lower end of the bar projecting forwardly from the frog and serving as the ground breaking point of the plow, the bar extending upwardly and rearwardly therefrom. The bar 15 has a uniform cross section of trapeziform and has a convex surface 20 which is cylindrical with respect to the axis of curvature of the bar 15. The landside face 21 of the bar 15 lies in a plane substantially perpendicular to the axis of curvature of the bar and therefore perpendicular to the convex surface 20. The upper or concave surface 22 of the bar 15 is conical about the transverse axis of curvature of the bar. This concave surface intersects the landside surface 21 of the bar at an acute angle and forms a sharp edge 23 which serves as the ground cutting front edge of the plow bottom. The upper face 22 inclines outwardly and rearwardly from the cutting edge 23 and is flush with the surfaces of the share 12 and moldboard 13 which abut against the fourth side 24 of the bar 15. The abutting surface 24 is perpendicular to the front face 22 of the bar, or, more strictly speaking, the elements of the conical surface 22 are perpendicular to the elements of the abutting surface 24 since the latter surface is also conical in form and has as its axis the axis of curvature of the bar. By making the abutting surface 24 perpendicular to the upper face 22, at least two distinct advantages are obtained. First, it permits the adjoining edge of the share to be cut perpendicular to its working face and thus involving a simple shearing operation during manufacture instead of a more complicated beveling operation as would be necessary if the abutting face 24 were parallel to the landside face 21. A second advantage of this construction is that it provides a small amount of overlap of the bar 15 with respect to the adjoining edge of the share 12, thus having the effect of restraining the front corner 25 of the share 12 from being curled rearwardly and upwardly when an obstruction is encountered during operation.

The share 12 is supported on an outwardly and rearwardly inclined portion of the plate 17 of the frog 11 which underlies the share and is secured thereto by bolts 30. The moldboard is also supported on the plate 17 and is held in abutment with the share and the bar 15 by means of plow bolts 31. The outer ends of the share and moldboard are rigidly braced against the frog by means of a bracing member 32 which is secured to the share and moldboard by plow bolts 33, 34, respectively, and to the vertical frog plate 16 by means of a plow bolt 35. The outer upper corner of the moldboard is rigidly braced by means of an extensible bracing rod 36 of more or less conventional design, one end of which is bolted to the corner of the moldboard by a bolt 37 and the opposite end of which is bolted to the vertical frog plate 16 by a bolt 38. The forward portion of the curved frog plate 17 is bent to form a flange portion 40, which is cylindrical about the transversely extending axis of curvature of the bar 15. The cylindrical flange 40 underlies the convex surface 20 of the bar in juxtaposition with respect thereto and thus provides a rigid support for the bar. The bar 15 is bolted to the flange 40 by means of stud bolts 41, which are received by threaded sockets 42 recessed into the convex face 20 of the bar. The bolts 41 extend through apertures 43 in the flange 40 and the stud bolts 41 are locked by means of suitable lock washers 44.

In normal position the forward end of the bar 15 is substantially tangent to the ground with the convex surface of the bar resting flat on the ground. The bar 15 is provided with a sharp penetrating edge 45 by beveling the end of the bar, preferably by grinding, on a plane which is inclined upwardly and rearwardly from the cutting edge 45 and also inclined at a slight angle rearwardly from the landside corner of the cutting edge 45.

During ground working operation the cutting edge 45 will, of course, gradually become dull. At such time, however, the bar can be easily sharpened by removing the latter from the plow bottom by withdrawing the three studs 41, and then grinding a new bevel on the front end of the bar. It is obvious that each time the bar is resharpened it is slightly shortened and consequently after a few sharpening operations, the front edge 45 of the bar will have receded until it is no longer tangent with the plane of the ground. To correct this condition, provision is made for adjusting the bar downwardly and forwardly along the cylindrical supporting flange 40, in the form of additional apertures 43 in the flange 40 through which the bolts 41 can be inserted. It is clear that by virtue of the fact that the bar is curved in a circular arc and is supported on a cylindrical surface having the same radius of curvature, the bar can be returned to its original operating position by sliding it downwardly and forwardly in its cylindrical support. Although I have shown but one threaded socket 42 for each stud 41, it will be evident to those skilled in the art that additional sockets can be provided in the bar 15 if so desired and thus increase the range or number of adjustments. I prefer, however, to provide a minimum number of threaded sockets in the curved bar 15 in order to avoid weakening it, and also to minimize the number of the more difficult drilling and tapping operations in the harder material of which the bar is made.

The share 12 can also be easily removed for sharpening by unbolting the bolts 30 and 33 which secure it to the frog and brace. The sharpening of the share 12 is a simpler operation than the sharpening of a conventional plow share due to its simpler shape and for the same reason replacement shares can be made less expensive.

The landside member 14 is made preferably as a casting to obtain the wear resisting qualities of cast iron. It is bolted to the vertical plate 16 of the frog 11 by means of bolts 35 and 46. The landside member 14 is cast with ridges 47 on the inner surface in order to obtain maximum strength with minimum weight. Apertures 48 are provided in the vertical plate 16 for use in bolting the frog 11 to the shank of a plow beam, as will be understood by those skilled in the art.

Referring now to the middlebreaker plow bottom, illustrated in Figures 4, 5 and 6, the shin member 50 is the equivalent of a pair of right and left hand bars 15 of the single moldboard plow bottom type, with the landside faces in abutment. The shin member 50 comprises a bar of pentagonal cross section curved in a circular arc. The convex side 51 of the bar 50 is generally cylindrical about the axis about which the bar is curved and is supported on the cylindrical central portion 53 of a curved frog plate 52. The shin member is secured to the frog by means of studs 54 which are received in threaded sockets 55 in the rear or convex side of the bar 50. Each of the studs 54 is insertable through one of several apertures 56 in the frog section 53 for purposes of adjustment as heretofore described in connection with the singe moldboard plow bottom. The bar 50 has a pair of upwardly converging sides on the concave side of the bar which intersect along a central edge 57 which serves as the front cutting edge of the plow. Thus the two upper faces 58, 59 are conical in shape and have as axis, the axis of curvature of the bar 50. The bar also has a pair of side faces 60, 61 perpendicular to the corresponding upper faces 58, 59, respectively, and serving as abutments for the two shares 62, 63 and the two moldboards 64, 65, respectively. The shares and moldboards are supported in outwardly rearwardly inclined positions on a pair of outwardly and rearwardly inclined wing portions of the frog plate 52 disposed on opposite sides of the central shin supporting portion 53. The wing portions of the frog are indicated by reference numerals 66 and 67. The shares and moldboards are rigidly secured to the frog by means of a plurality of plow bolts 68.

The forward end of the bar 59 is beveled on a pair of outwardly and rearwardly inclined planes forming a pair of faces 69, 70 which intersect along central cutting edge 71 and forming a pair of rearwardly diverging cutting edges 72, 73 across the lower forward edge of the bar 50.

The plow bottom is supported on the tool shank by means of a pair of laterally spaced bolts disposed on opposite sides of the center line of the bottom, respectively, one of which is shown at 75 in Figure 5. Each of the bolts 75 has a head 76 which is received in a recess formed by pressing the metal of the frog plate 52 rearwardly to form bulges 77 on the rear of the frog on opposite sides of the center line thereof. The upper edge of the frog 52 is bent rearwardly to provide a bearing 78 against which the frog seats upon the supporting shank.

I do not intend my invention to be limited to the exact details shown and described in this disclosure except as limited by the claims which follow.

I claim:

1. A plow bottom of the moldboard type, comprising a frog having a moldboard receiving section, an arcuate bar forming a combined point and shin member having upper and lower faces, both formed as surfaces of revolution about a common axis, the upper face being substantially conical and the furrowward edge of the bar being arcuate about said axis, said axis being substantially perpendicular to the vertical plane of forward travel of the plow bottom, said frog having a portion formed as a surface of revolution about said axis to receive the lower face of said bar, a moldboard fixed to the moldboard receiving section of said frog and having an edge arcuate about said axis fitting against the arcuate edge of said bar with the upper face of the moldboard flush with the substantially conical upper face of the bar, forming a smooth continuous surface, and means for adjustably fixing said bar to said bar-receiving portion of the frog in different positions thereon so as to provide for shifting said arcuate bar downwardly and forwardly about said axis, whereby the upper faces of said bar and moldboard remain substantially flush one with the other and maintain said continuous smooth surface in all adjusted positions of the bar on the frog.

2. A plow bottom as defined in claim 1, further characterized by said frog having a share receiving section below the moldboard receiving section, and a share blade fixed to the share receiving section of the frog and having an edge arcuate about said axis abutting the moldboard edge of said arcuate bar, the abutting surfaces of said bar, share and moldboard lying in a substantially conical surface of revolution about said axis, the elements of which are substantially perpendicular to the intersecting elements of said substantially conical upper face of said bar, whereby the latter overlies the adjacent edges of the moldboard and share.

3. A plow bottom as defined in claim 1, further characterized by the lower surface of said bar and the bar-receiving surface of said frog being cylindrical about said axis, the moldboard edge of said bar being at least substantially as thick as the moldboard and the land side of said bar opposite the moldboard edge thereof lying substantially in a plane perpendicular to said common axis, whereby the land side of the bar is of materially greater thickness than said moldboard edge of said bar.

4. A plow bottom as defined in claim 1, further characterized by said frog having a moldboard receiving section at each side of the frog and a share receiving section below each moldboard receiving section, the upper face of said bar being formed as two intersecting conical surfaces of revolution about said common axis and the line of intersection forming a central ground cutting edge arcuate about said common axis, a share blade and a moldboard fixed to each share-receiving section and moldboard-receiving section of the frog, each share blade and moldboard having the edges adjacent said bar arcuate about said axis and adapted to fit in abutting relation against the sides of said bar, whereby the upper generally conical surfaces of said bar and the adjacent edges of both moldboards and share blades are maintained substantially flush with one another to provide two substantially smooth continuous moldboard surfaces extending laterally and rearwardly from said central cutting edge.

5. A combined point and shin member for a moldboard plow having a share blade, comprising a generally arcuate bar having upper and lower surfaces, one formed as a conical surface of revolution tapering landwardly and the other as a cylindrical surface of revolution, said surfaces having a common axis of generation, the moldboard edge of said bar being a conical surface tapering furrowwardly, the axis of which coincides with said first mentioned axis, said share blade having an edge that engages under the conical edge at the lower part of said bar.

6. A combined point and shin member for a moldboard plow having a share blade, comprising a generally arcuate bar having upper and lower surfaces formed as surfaces of revolution with a common axis of generation, the moldboard edge of said bar being a conical surface tapering furrowwardly, the axis of which coincides with said first mentioned axis, said share blade having an edge that engages under the conical edge at the lower side of said bar.

7. A plow bottom as defined in claim 1, further characterized by said frog having a share receiving section below the moldboard receiving section, and a share blade fixed to the share receiving section of the frog and having an edge arcuate about said axis abutting the moldboard edge of said arcuate bar, the abutting surfaces of said bar, share and moldboard lying in a substantially conical surface of revolution about said axis and tapering furrowwardly, whereby the furrowward edge of the bar overlies the adjacent edges of the moldboard and share.

8. A share blade having a landward edge lying substantially in a conical surface of revolution, the elements of which are substantially normal to the general plane of the blade and which, when the blade is in place on the plow bottom of which the share blade is adapted to form a part, taper furrowwardly, the axis of said conical surface of revolution lying substantially perpendicular to the vertical plane of forward travel of the plow bottom, said share blade rearwardly of its forward cutting edge being of substantially uniform thickness from its landward edge to its furrowward edge.

CARL G. STRANDLUND.

CERTIFICATE OF CORRECTION.

Patent No. 2,312,371. March 2, 1943.

CARL G. STRANDLUND.

It is hereby certified that error appears in the printed specification of the above numbered patent requiring correction as follows: Page 3, second column, line 48, claim 6, for "side" read --part--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.